US008871139B2

(12) United States Patent
Frage et al.

(10) Patent No.: US 8,871,139 B2
(45) Date of Patent: Oct. 28, 2014

(54) MANUFACTURING TRANSPARENT YTTRIUM ALUMINUM GARNET BY SPARK PLASMA SINTERING

(75) Inventors: Nahum Frage, Beer Sheva (IL); Moshe Dariel, Omer (IL); Sergei Kalabuchov, Beer Sheva (IL)

(73) Assignee: Ben-Gurion University of the Negev Research and Development Authority, Beer Sheva (IL)

( * ) Notice: Subject to any disclaimer, the term of this patent is extended or adjusted under 35 U.S.C. 154(b) by 0 days.

(21) Appl. No.: 13/378,287

(22) PCT Filed: Jun. 22, 2010

(86) PCT No.: PCT/IL2010/000494
§ 371 (c)(1),
(2), (4) Date: Dec. 14, 2011

(87) PCT Pub. No.: WO2010/150250
PCT Pub. Date: Dec. 29, 2010

(65) Prior Publication Data
US 2012/0088649 A1    Apr. 12, 2012

Related U.S. Application Data

(60) Provisional application No. 61/213,615, filed on Jun. 24, 2009.

(51) Int. Cl.
| | |
|---|---|
| C04B 35/505 | (2006.01) |
| C04B 35/44 | (2006.01) |
| C04B 35/645 | (2006.01) |
| B82Y 30/00 | (2011.01) |

(52) U.S. Cl.
CPC .......... *C04B 35/44* (2013.01); *C04B 2235/666* (2013.01); *C04B 35/645* (2013.01); *C04B 2235/96* (2013.01); *B82Y 30/00* (2013.01); *C04B 2235/6567* (2013.01); *C04B 2235/77* (2013.01); *C04B 2235/3203* (2013.01); *C04B 2235/9653* (2013.01); *C04B 2235/764* (2013.01); *C04B 2235/6562* (2013.01); *C04B 2235/445* (2013.01); *C04B 2235/786* (2013.01); *C04B 2235/3225* (2013.01); *C04B 2235/3222* (2013.01); *C04B 2235/5454* (2013.01); *C04B 2235/81* (2013.01)
USPC ....................................................... 264/603

(58) Field of Classification Search
USPC ....................................................... 264/603
See application file for complete search history.

(56) References Cited

U.S. PATENT DOCUMENTS

| | | | | |
|---|---|---|---|---|
| 4,543,346 | A | * | 9/1985 | Matsui et al. ................. 501/120 |
| 4,584,151 | A | * | 4/1986 | Matsui et al. ................. 264/1.21 |

(Continued)

FOREIGN PATENT DOCUMENTS

| | | |
|---|---|---|
| FR | 2917404 | 12/2008 |
| JP | 5294724 | 11/1993 |

(Continued)

OTHER PUBLICATIONS

Mezeix L. and Green D.: Appl. Ceramic Technol. 3 (2006) 166-76.
Fedyk R. et al.: Optical Materials 29 (2007) 1252-7.
Chaim R. et al.: Mater. Sci. Eng. A 429 (2006) 74-8.
IPRP (5 pages) mailed on Jan. 4, 2012.

(Continued)

*Primary Examiner* — Joseph S Del Sole
*Assistant Examiner* — Russell Kemmerle, III
(74) *Attorney, Agent, or Firm* — Roach Brown McCarthy & Gruber, P.C.; Kevin D. McCarthy

(57) ABSTRACT

This invention provides a polycrystalline yttrium aluminum garnet (YAG) which is transparent in the visible and near infrared region. The invention also provides a method of manufacturing a transparent sintered YAG, which has nearly no porosity.

3 Claims, 2 Drawing Sheets

(56) References Cited

U.S. PATENT DOCUMENTS

| | | | |
|---|---|---|---|
| 7,022,262 B2* | 4/2006 | Lee et al. | 252/301.4 R |
| 7,691,765 B2* | 4/2010 | Suzuki et al. | 501/152 |
| 2003/0087751 A1 | 5/2003 | Hamada et al. | |
| 2004/0109808 A1* | 6/2004 | Lee et al. | 423/263 |
| 2009/0072700 A1 | 3/2009 | Kameshima et al. | |
| 2009/0108507 A1 | 4/2009 | Messing et al. | |
| 2010/0048378 A1* | 2/2010 | Tang et al. | 501/133 |
| 2013/0106009 A1* | 5/2013 | Sepulveda et al. | 264/28 |

FOREIGN PATENT DOCUMENTS

| | | |
|---|---|---|
| JP | 05294724 | 11/1993 |
| WO | 2010/008596 | 1/2010 |

OTHER PUBLICATIONS

Patterson M C L et al. "Spinel armor—clearly the way to go" Jan. 1, 2003 vol. 24, No. 3.

Chaim R et al. "Transparent YAG ceramics by surface softening of nanoparticles in spark plasma sintering" (Aug. 15, 2006).

Chaim et al. "Transparent yttrium aluminum garnet (YAG) ceramics by spark plasma sintering" (Jan. 1, 2007).

Tobi Even-Zur O et al. "Effect of green density and electric field direction on densification of YAG nano-powders by spark plasma sintering" (Feb. 26, 2009).

Rachman Chaim et al. "Grain size control by pressure application regime during spark plasma sintering of Nd-YAG nanopowders" (Jun. 1, 2008).

Frage N et al. "Densification of transparent yttrium aluminum garnet (YAG) by SPS processing" (Dec. 1, 2010).

\* cited by examiner

MANUFACTURING TRANSPARENT YTTRIUM ALUMINUM GARNET BY SPARK PLASMA SINTERING

FIELD OF THE INVENTION

The present invention relates to a method for manufacturing an artificial gem, yttrium aluminum garnet, in a polycrystalline form while rendering the material highly transparent for the visible and infrared light.

BACKGROUND OF THE INVENTION

Yttrium aluminum garnet (having formula $Y_3Al_5O_{12}$ and abbreviated as YAG) is a synthetic crystalline material of the garnet group, used as an artificial gem. YAG is commonly used as host material for solid-state lasers. Rare earth elements such as neodymium and erbium can be doped into YAG as active laser ions, the lasers being employed for a wide range of military applications, medical applications, and also as efficient tools for cutting and welding metals. Polycrystalline YAG is much cheaper to manufacture than its monocrystalline counterpart, and it was reported to have good mechanical properties [Mezeix L. and Green D.: Appl. Ceramic Technol. 3 (2006) 166-76]. Polycrystalline YAG becomes a promising substitute for single crystal YAG, and it might be used for a wide range of optical applications, if sufficient transparency is provided. The fabrication of transparent YAG ceramic by conventional pressure-less sintering approach was tried, but it requires relatively high sintering temperatures (above 1600° C.) and a subsequent HIP (High Isostatic Pressure) treatment, and is also accompanied by undesired grain growth [Fedyk R. et al.: Optical Materials 29 (2007) 1252-7]. The technique of spark plasma sintering (SPS) was attempted for the production of polycrystalline YAG, but only non-transparent specimens were obtained [Chaim R. et al.: Mater. Sci. Eng. A 429 (2006) 74-8]. It is therefore an object of the invention to provide a method of manufacturing transparent YAG.

It is another object of this invention to provide a method of manufacturing polycrystalline yttrium aluminium garnet (YAG) while employing spark plasma sintering (SPS).

It is a still further object of this invention to provide a method of manufacturing polycrystalline yttrium aluminum garnet (YAG) while employing relatively lower temperatures.

It is also an object of the invention to provide a cheap transparent YAG, with good hardness and strength.

Other objects and advantages of present invention will appear as description proceeds.

SUMMARY OF THE INVENTION

This invention provides sintered yttrium aluminum garnet (YAG), having formula $Y_3Al_5O_{12}$, comprising from 0.15 to 0.35 wt % lithium fluoride (LiF) based on the YAG weight. In one preferred embodiment, said YAG contains 0.25 wt % LiF based on the YAG weight. Sintered YAG according to the invention has essentially nearly full theoretical density. When relating to "full theoretical density", intended is maximal density of $Y_3Al_5O_{12}$ which has nearly zero porosity, as measured by the liquid displacement method. YAG according to the invention usually exhibits in its microstructure particles of an average size of from about 1 μm to about 2 μm, when characterized by scanning electron microscopy (SEM). Sintered yttrium aluminum garnet (YAG) according to the invention preferably exhibits essentially full density. Sintered yttrium aluminum garnet (YAG) according to the invention is transparent, and preferably exhibits a transmittance greater than 70% for a slab 1.8 mm thick, for a wavelength of from 0.5 μm to 4 μm.

The invention relates to a polycrystalline YAG which is practically transparent for the light in the visible and infrared region. The polycrystalline YAG of the invention comprises from 0.15 to 0.35 wt % LiF based on the YAG weight fraction. The invention relates to polycrystalline sintered YAG, wherein final consolidated YAG samples have good HV hardness, for example 1450 or more, and good bending strength, for example 300 MPa or more.

The invention provides a method of manufacturing transparent yttrium aluminum garnet (YAG) comprising the steps of i) providing a powder of yttrium aluminum garnet; mixing said powder with lithium fluoride (LiF) in an amount of from 0.15 to 0.35 wt % of the powder weight, and homogenizing the mixture; iii) sintering the mixture by employing the technique of spark plasma sintering (SPS), wherein the sintering temperature is not higher than 1300° C., thereby obtaining a sintered YAG body; iv) polishing said body, thereby obtaining a transparent YAG specimen; wherein said body has a transmittance greater than 70% for a wavelength between 0.5 and 4 μm. Said powder of yttrium aluminum garnet to be used in the method according to the invention may comprise a commercial material of YAG, such as, for example, provided by Nanocerox Inc., USA. Said powder is preferably a nanopowder. Said sintering in the method according to the invention preferably comprises a temperature increase to 1300° C., at a rate of about 100°/min. The temperature regimen preferably includes holding temperature at 1300° C. for a duration that depends on the thickness of the sample, roughly one hour for every millimeter of the thickness.

BRIEF DESCRIPTION OF THE DRAWINGS

The above and other characteristics and advantages of the invention will be more readily apparent through the following examples, and with reference to the appended drawings, wherein:

FIG. 3. shows SEM of YAG materials processed by SPS, the bar corresponding to 1 μm; FIG. 3A and 3C show materials prepared in accordance with one embodiment of the invention, 3B and 3D materials non-doped with lithium fluoride; the circles in FIG. 3D delineate areas in which residual porosity was detected.

DETAILED DESCRIPTION OF THE INVENTION

Figure 1:
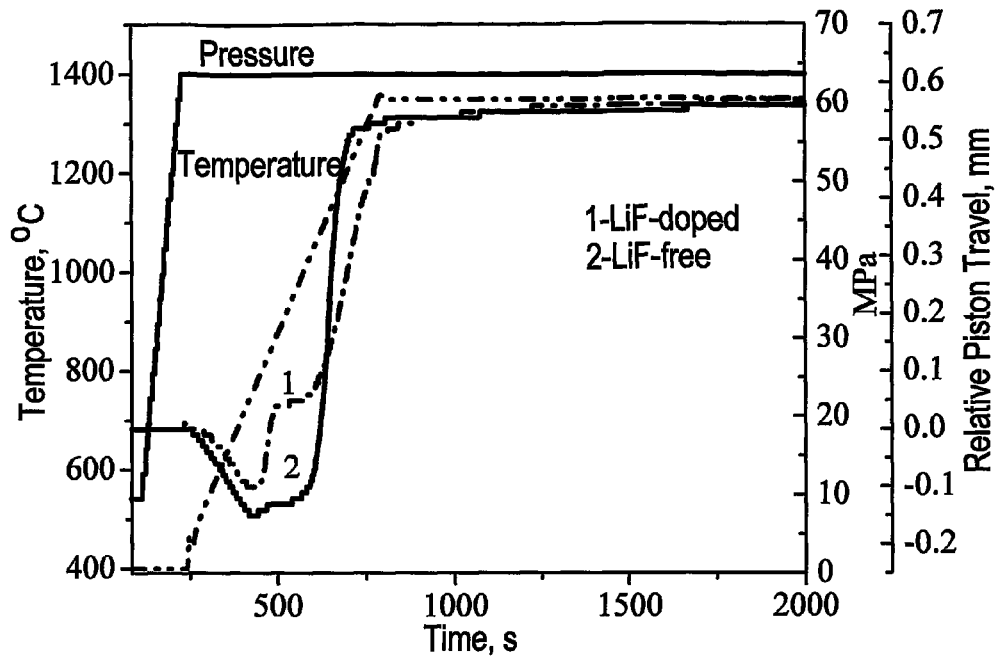
FIG. 1. Shows parameters of the SPS process for the fabrication of the garnet specimens from powders without/with LiF-doping; the leftmost full line ("Pressure") stands for the applied pressure (in MPa), the broken line shows the temperature in (° C.), and the curves correspond to the piston displacement (Piston Travel, mm) for the doped specimen (the dash-and-dot curve, 1); and for the un-doped specimen (the full curve, 2)

It has now been surprisingly found that a transparent YAG can be obtained from the commercial YAG powder, while employing spark plasma sintering. The present invention relates to the fabrication of transparent specimens by spark plasma sintering of commercial YAG powder in the presence of a small amount of lithium fluoride (LiF) additive. The YAG powders, for example produced by flame spray pyrolysis (FSP) process, may be employed. It was found that an admixture of lithium fluoride (LiF) to an as-received powder of YAG, in a range of from 0.15 to 0.35 wt % LiF, provided the desired effect. YAG powder and LiF additive were blended, for example, by dry milling for a duration of 2 hours in a container made of a fully dense, sintered YAG, in order to prevent powder contamination. At the outcome of the SPS treatment, the relative density of the samples, determined by the liquid displacement method (the theoretical density of YAG was taken as 4.55 g/cm$^3$), showed that the LiF-doped specimens had attained full density, while the specimens sintered in the absence of the LiF addition had about 0.5 vol. % residual porosity. Scanning Electron Microscopy (SEM) was applied for microstructural characterization of the sintered specimens (FIG. 3). The micrographs images clearly illustrate the difference between the un-doped and the LiF-doped garnet samples. The un-doped specimens display a fine sub-micron microstructure, whereas the LiF-doped samples have a slightly larger grain-size, for example of the order of 1.5 μm. The microstructure was revealed by thermal etching in air at 1200° C. for 1 h. The presence of the residual porosity in the samples fabricated in the absence of LiF is visible in the image of the thermally etched polished sample. Three point bending tests were conducted on bars machined from the SPS consolidated discs, for doped/un-doped samples, according to ASTM C116 specification. The elastic modulus of the composites was derived from the ultrasonic sound velocity measurements, and the Vickers hardness values were determined using a Buehler micro-hardness tester under a 2 kg load. The values of Young modulus for both sets of specimens are similar, while the hardness and the strength values for specimens fabricated with LiF addition are slightly lower than those of the undoped samples. The slight decrease of the mechanical properties is attributed to their, increased grain size. The garnet prepared according to the invention has high transparency; for example 1.8 mm thick slabs according to the invention had a transparency of more than 80% for the wavelength of 1 μm, compared to 50% for the un-doped, comparison sample.

The SPS consolidation treatment according to the invention enables to achieve the full densification of the commercially available YAG powder. The presence of a small amount of LiF dopant, such as 0.25 wt. %, affects the ceramic microstructure, eliminating residual porosity and allowing to achieve high levels of light transmission. The weight fraction of the LiF additive should preferably not exceed 0.4 wt %, since a higher fraction leads to increased brittleness and fracture of the samples after the SPS treatment. The starting YAG powder is preferably nano-sized, for example having and average particle size of 50-70 nm, yielding a single phase YAG composition after a treatment at 1100° C.

The SPS treatment in the method according to the invention preferably consists of heating at a rate of 100°/min up to 1300° C., and holding at that temperature for time durations that depend on the thickness of the YAG samples. The preferred time duration is roughly one hour per mm of the thickness. The pressure is applied in parallel with heating, up to the maximal pressure of 70 MPa in the course of 2 min. The polishing conditions in the method according to the invention may comprise those commonly used for optical surface preparations, possibly ending with 0.2 μm diamond polishing paste.

Thus, in one aspect, this invention provides a polycrystalline YAG which is practically transparent in the visible and near infrared region. In another aspect, the invention provides a sintered YAG which has practically full theoretical density.

The invention will be further described and illustrated by the following example.

Example

Figure 3A:
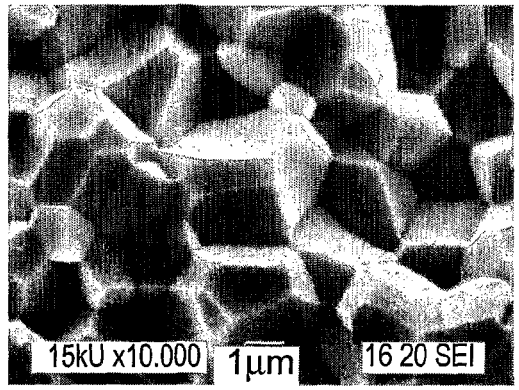
FIG. 3A and 3B show fractured surfaces, 3C and 3D polished surfaces.
Figure 3B:
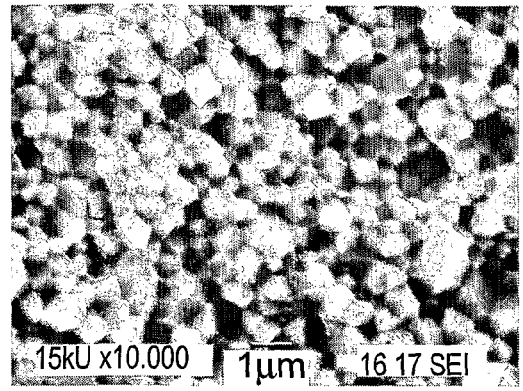
Figure 3C:
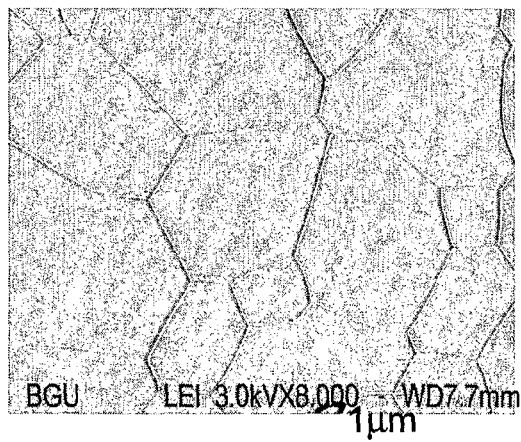
Figure 3D:
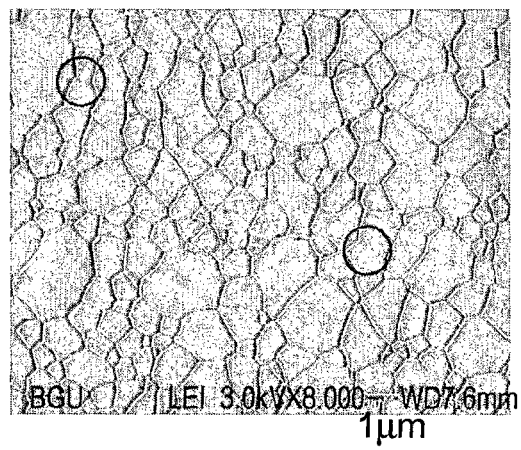

The YAG powder produced by flame spray pyrolysis (FSP) process was purchased from Nanocerox, Inc. Two sets of samples, one from the as-received powder and the other with 0.25 wt % LiF addition were inserted in the 20 mm diameter graphite die of the SPS apparatus (FCT Systeme GmbH). Identical parameter profiles were applied to both sets of samples in order to allow identifying the effect of the LiF additive. The temperature was measured by a pyrometer focused on the upper graphite punch. The main process parameters for heating and holding at sintering temperature, including the displacement of the upper punch, which reflects the shrinkage, i.e. densification of the sample, are summarized in FIG. 1. The highest sintering temperature was 1300° C. The pressure loading of the samples starts form 8 MPa and increases to a maximal applied pressure of 62 MPa. The holding time for achieving adequate transparency has to be about 2 hours. The curves show the location of the punch, for the doped and undoped YAG powder, respectively, which follows the thermal expansion and the dimensional changes induced by sintering. According to the recorded data (FIG. 1), significant sintering of the doped powder starts at about 950° C., while for the un-doped powder it takes place at 1250° C. Almost complete densification is achieved after 12 and 16 min of isothermal sintering at 1300° C. for the doped and undoped powders, respectively. At the outcome of the SPS treatment, the relative density of the samples, determined by the liquid displacement method (the theoretical density of YAG was taken as 4.55 g/cm$^3$), showed that the LiF-doped specimens attained full density, while the specimens sintered in the absence of the LiF addition had about 0.5 vol. % residual porosity Scanning Electron Microscopy (SEM) (JEOL®JSM-5600) was applied for microstructural characterization of the sintered specimens. In order to reveal the microstructure, polished YAG samples had to undergo thermal etching in air at 1350° C. for 2 h. Micrographs of the fracture surface and the polished specimens were obtained by scanning electron microscopy (SEM) (JEOL®JSM-5600) and are shown in FIGS. 3A to 3D. The micrographs images put in evidence the difference between the un-doped and the LiF-doped garnet samples. The un-doped specimens display a fine microstructure at the level of 1 μm (the bar in the figures corresponds to 1 μm), while the LiF-doped samples have a coarser structure (average particle size of about 1.5 μm), in part due to the thermal etching treatment. The presence of the residual porosity in the samples fabricated in the absence of LiF is visible in the image of the thermally etched polished sample. In both samples inter-granular fracture takes place (FIG. 3A and 3B). Microstructure of the SPS processed YAG specimens are shown, fractured and polished samples fabricated with LiF addition (FIG. 3A and 3C) and without (FIG. 3B and 3D), respectively. Three point bending tests were conducted on 3 mm×4 mm×20 mm bars, which had been machined from the SPS consolidated discs. The elastic modulus of the composites was derived from the ultrasonic sound velocity measurements and the Vickers hardness values were determined using a Buehler micro-hardness tester under a 2 kg load. The mechanical properties are presented in Table 1.

TABLE 1

Properties of the samples provided by SPS processes, un-doped and doped with LiF

| | Relative density (%) ± 0.5 | Young modulus (GPa) ± 2 | Hardness HV ± 10 | Bending strength (MPa) ± 15 |
|---|---|---|---|---|
| Undoped sample | 99.5 | 290 | 1490 | 340 |
| Doped sample | 100.0 | 290 | 1450 | 300 |

Figure 2:
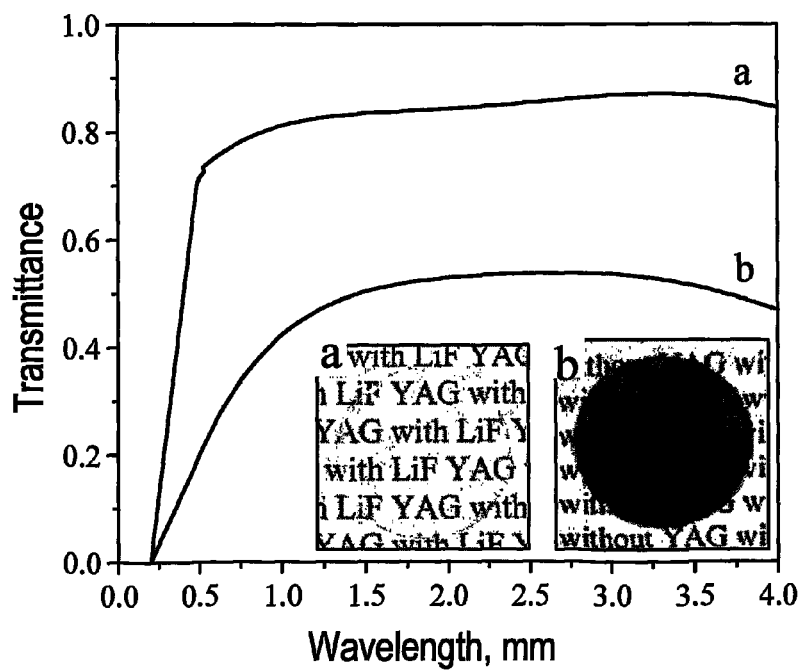
FIG. 2. shows optical transmittance of YAG specimens manufactured according to one embodiment of the invention (a), and without LiF-doping (b) addition; the inserts show a text viewed through YAG specimens 1.8 mm thick, described under (a) and (b), respectively.

The values of Young modulus for both specimens were similar, while the hardness and the strength values for specimens fabricated with LiF addition were slightly lowered. The lower strength and hardness of the doped sample reflect its slightly coarser microstructure. Light transmission characteristics for the doped and un-doped specimens are shown in FIG. 2. Optical transmittance of YAG specimens with (a) and without (b) LiF addition, for specimens 1.8 mm thick. Light transmission for LiF-doped samples is higher than 80%, while for un-doped specimens that had undergone a similar SPS treatment, it is below than 50%. The SPS consolidation treatment allows achieving full densification of the commercially available YAG powder. The presence of 0.25 wt % LiF dopant affects the ceramic microstructure, eliminates residual porosity and allows achieving high levels of light transmission.

While the invention has been described using some specific examples, many modifications and variations are possible. It is therefore understood that the invention is not intended to be limited in any way, other than by the scope of the appended claims.

The invention claimed is:

1. A method of manufacturing the sintered yttrium aluminum garnet (YAG) comprising the steps of
   i) providing a powder of yttrium aluminum garnet;
   ii) mixing said powder with lithium fluoride (LiF) in an amount of from 0.15 to 0.35 wt % of the powder weight, and homogenizing the mixture;
   iii) sintering the mixture by employing the technique of spark plasma sintering (SPS), wherein the sintering temperature is not higher than 1300° C. and is held for a duration that depends on the thickness of the sample, one hour for every millimeter of the thickness, thereby obtaining a sintered YAG body exhibiting an average particle size of about 1.5 μm in its SEM microstructure;
   iv) polishing said body, thereby obtaining a transparent YAG specimen having a relative density of 100.0%;
   wherein said body has a transmittance greater than 70% for a wavelength of from 0.5 μm to 4 μm, for a thickness of 1.8 mm.

2. The method of claim 1, wherein said powder of yttrium aluminum garnet is a nanopowder.

3. The method of claim 1, wherein said sintering comprises a temperature increase to 1300° C. at a rate of 100° C./min.

* * * * *